United States Patent [19]

Pinto

[11] 4,242,317

[45] Dec. 30, 1980

[54] AMMONIA SYNTHESIS PROCESS

[75] Inventor: Alwyn Pinto, Stockton-on-Tees, England

[73] Assignee: Imperial Chemical Industries Limited, London, England

[21] Appl. No.: 936,402

[22] Filed: Aug. 24, 1978

[30] Foreign Application Priority Data

Aug. 26, 1977 [GB] United Kingdom ............... 35933/77
Oct. 28, 1977 [GB] United Kingdom ............... 44995/77

[51] Int. Cl.³ ............................................. C01C 1/02
[52] U.S. Cl. .................................................... 423/359
[58] Field of Search .............................. 423/359–363; 252/374–377

[56] References Cited

U.S. PATENT DOCUMENTS

| | | | |
|---|---|---|---|
| 1,664,997 | 4/1928 | Slade et al. | 423/359 |
| 3,343,916 | 9/1967 | Cahn et al. | 423/359 |
| 3,349,569 | 10/1967 | Nebgen | 423/360 |
| 4,055,627 | 10/1977 | Guadalupi | 423/359 |
| 4,148,866 | 4/1979 | Becker | 423/359 |

FOREIGN PATENT DOCUMENTS

1057020 2/1967 United Kingdom ...................... 423/359
1186939 4/1970 United Kingdom ...................... 423/359

*Primary Examiner*—Earl C. Thomas
*Assistant Examiner*—Wayne A. Langel
*Attorney, Agent, or Firm*—Cushman, Darby & Cushman

[57] ABSTRACT

In an ammonia synthesis process at a pressure under 120 bar bas. ammonia is recovered from incompletely reacted synthesis gas by absorption in water. Unreacted synthesis gas is dried preparatory to further reaction by passing it through a charge of regenerable solid absorbent until that charge is loaded with water and switching its flow to a fresh or regenerated charge. The loaded charge is regenerated by passing ammonia-containing reacted synthesis gas through it, the displaced water being separated in the ammonia absorption step. Alternatively or additionally the water content of the unreacted synthesis gas is decreased by contacting it with liquid aqueous ammonia at below 0° C.

7 Claims, 2 Drawing Figures

AMMONIA SYNTHESIS PROCESS

This invention relates to an ammonia synthesis process and plant characterised by a procedure for recovering product ammonia and treating synthesis gas after recovery of ammonia.

In ammonia synthesis it is usual to pass a mixture of nitrogen and hydrogen over an iron catalyst at elevated pressure and temperature, cool the reacted gas to a temperature at which ammonia condenses, separate liquid ammonia and pass unreacted gas again over the iron catalyst, usually by recycling it. Cooling has to be to a lower temperature the lower the pressure and consequently a point is reached at which the saving in capital cost and compression power requirement due to lower pressure is outweighed by increased costs due to low temperature refrigeration. It has therefore been proposed to recover ammonia by absorption in water, but this introduces the problem of preventing water from reaching iron catalyst and deactivating it. It has been proposed by SNAM technologists to remove such water by cooling (UK Pat. No. 1115952) and further treatment such as adsorption (UK Pat. No. 1314939) or liquid ammonia washing (Hydrocarbon Processing July 1972, 108–110), in processes at pressures preferably in the range 130–200 bar. Below 120 bar especially 100 bar or less, for example 40–80 bar, the SNAM process sequence is less attractive because the cooling stage requires too powerful refrigeration. It has been proposed in UK Pat. No. 1064071 to dry the recycle gas with silica gel cycled between a drying bed and a regeneration bed between the synthesis heat exchanger and the absorber.

We have now devised a method of remving both water and ammonia from the recycle gas without the cooling stage specified in the SNAM process (a) by using a solid absorbent and regenerating the absorbent without external heat and/or (b) by contact with cold aqueous ammonia.

According to the invention in its first aspect an ammonia synthesis process comprises (a) passing a mixture of nitrogen and hydrogen over an ammonia synthesis catalyst whereby to effect incomplete reaction to ammonia;

(b) cooling the reacted gas mixture;

(c) recovering ammonia from the cooled gas mixture by absorption in water; and (d) drying unreacted gas and passing it over an ammonia synthesis catalyst;

and is characterised by comprising the following steps:

(i) operating at a pressure under 120 bar abs;

(ii) in step (d) drying the unreacted gas by passing it through a charge of regenerable solid absorbent until that charge is loaded with water and switching the unreacted gas flow to a fresh or regenerated charge;

(iii) contacting synthesis gas after step (a) but before step (c) with the water-loaded charge produced in step (ii) whereby to displace water from it and provide the regenerated charge used in step (ii);

(iv) separating the displaced water with the ammonia in step (c).

In a typical process the unreacted gas is recycled to step (a). Fresh nitrogen-hydrogen mixture is fed to the process most conveniently between steps (c) and (d), whereby any water vapour in it is removed by the solid absorbent. It could be fed between steps (b) and (c) less conveniently.

In a recycle process the concentration of any non-reacting gases such as methane and noble gases and nitrogen or hydrogen in excess of the stoichiometric quantity will gradually build up. Consequently a stream containing recycled synthesis gas is purged off. The purged gas contains hydrogen and usually methane, and can thus be used as a fuel or hydrogenating gas but for better energy economy is treated by for example cryogenic fractionation or selective adsorption or diffusion, to separate a hydrogen-enriched stream and return it to the synthesis. The purge is taken most conveniently after the ammonia absorber before or less suitably after admission of fresh synthesis gas.

The temperature of the steps in the process are typically as follows:

step (a)

catalyst inlet: 300°–400° C.

catalyst outlet: above catalyst inlet temperature and in the range 350°–430° C.

Within these limits the temperature may be controlled by means such as cold or warm gas injection, indirect heat exchange with the feed gas mixture before reaction or indirect heat exchange with other streams such as water or steam. More than one catalyst bed can be used;

step (b) cooling is typically carried out in several stages, for example to 200°–400° C. by heat exchange with boiler feed water and/or warm feed gas mixture;

to 50°–100° C. by heat exchange with cold feed gas mixture;

to 20°–50° C. by heat exchange with air or cooling water;

step (c) after absorption of ammonia in water, unreacted gas leaves the absorber at 30°–40° C.;

step (d) gas entering the solid absorbent is typically at 30°–40° C. There is only a small exothermic heat of absorption, since the water content of the gas entering the absorbent is very low; the cold gas is re-heated to catalyst inlet temperature in the first cooling stage of step (b).

step (iii) the temperature at which the solid absorbent is regenerated depends on what absorbent is used and is also chosen to ensure that the second charge of absorbent is adequately regenerated by the time that the wet gas has to be switched to it from the first charge. The position of the vessel containing the absorbent among the stages of cooling the reacted synthesis gas is chosen to suit the temperature required. Regeneration can be by means of a small flow of high temperature gas (the remainder being by-passed) or a larger flow of less hot gas. Suitable temperatures are in the range 60°–350° C.

The process is especially suitable at pressures in the range 30–120, for example 40–80 bar abs. Such lower pressures make it readily practicable to switch the gas flows by means of valves and are also desirable since they can be attained or approached in fresh synthesis gas generation, so that compression of fresh synthesis gas need be by no more than 50%, preferably no more than is required to maintain circulation, for example up to 20% or by no more than 100 bar (especially 20–80 bar) as in a single-barrel compressor-circulator. The combination of the process of ammonia synthesis as herein defined with fresh synthesis gas generation with such limited, if any, compression of fresh synthesis gas constitutes an important form of the invention. Synthesis gas generation may in particular be by partial oxidation of a carbonaceous feedstock at 30–120 bar abs. or by catalytic steam reforming of gaseous or normally liquid hydrocarbons at such pressures or more conveniently 40–80 bar abs., either such steps being followed by known steps including shift and carbon oxides removal. When synthesis gas generation is by primary steam reforming at 40–80 bar to give gas with a methane content in the range 10–20% by volume on a dry basis, secondary reforming with sufficient air to give an $H_2/N_2$ ratio of 2.0 to 2.9, shift conversion and carbon oxides removal, and is followed by removal of excess nitrogen from synthesis gas after recovery of ammonia from it and return of a hydrogen-enriched stream to the synthesis, the over-all ammonia production process is particularly economical in energy consumption. Such a process is described in our co-pending UK application taking priority from applications Nos. 35096/77, 44766/77 and 44996/77.

The regenerable solid absorbent may be any hydratable oxide, for example alumina, silica gel, amorphous aluminosilicates and crystalline aluminosilicates, that lose water at temperatures up to 550°, the highest temperature conveniently attainable in reacted ammonia synthesis gas. Active carbon can be used, if desired. Compounds such as sodium hydroxide and potassium hydroxide are less convenient owing to their relatively low melting points. Among the crystalline aluminosilicates the zeolites are especially suitable. Small-pore zeolites such as zeolites of the A type (for example 3A and 5A), chabazite and erionite, medium-pore zeolites such as mordenite and those of the ZSM-5 family, and also large pore zeolites such as zeolites X, Y and omega can be used. Especially if the zeolite is in its hydrogen or heavy metal cation form it will absorb also ammonia and thus decrease the proportion of ammonia in the gas fed to the catalyst; such absorbed ammonia is desorbed in the regeneration step and recovered in the ammonia separation step. The heavy metal cation is preferably one that forms ammine complexes, for example, copper, silver, cobalt or nickel.

Each charge of solid absorbent can contain more than one material. It is also within the invention to use two or more charges in parallel, so that, for example in drying, a large proportion of the gas flows through one charge and is dried by it and a small proportion flows through the other and prepares it for use by cooling it from its regeneration temperature to the temperature of the gas being dried. Similarly in regeneration part of the gas flow can be through one charge, which it regenerates, while part is through the other charge, which it heats preparatory to regeneration. In an economical process three charges are used, which at any point in time are respectively drying synthesis gas, being regenerated and being cooled after regeneration. In a preferred arrangement two charges are used in parallel for drying synthesis gas and these are operated out of step by half the water-loading time. Very suitably the gas flow rates and temperatures in regeneration and cooling are chosen so that both regeneration and cooling take place within the water-loading time or, in the preferred arrangement, half that time. By such arrangements it is possible to avoid fluctuations in gas temperature and in efficiency of regeneration at times of switching gas flows from the first to the second charge. The above-mentioned hydrogen rich stream separated from the purge stream can very conveniently be used to cool the regenerated absorbent before being returned to the synthesis.

According to the invention in its second aspect a process of ammonia synthesis comprises the steps (a) to (d) set out above and is characterised in that in drying the gas in step (d) the content of residual water is decreased by contacting it with liquid aqueous ammonia at a temperature below 0° C.

The above catalyst temperatures and operating pressures relate to a synthesis catalyst of the usual type namely iron with promoting quantities of non-reducible oxides such as those of potassium, calcium, aluminium and others such as of beryllium, cerium or silicon. In order to afford maximum activity and thus to compensate for the lower rate of reaction due to low pressure, the iron catalyst preferably contains also cobalt, suitably to the extent of 1–20% w/w calculated as $Co_3O_4$ on the total oxidic composition from which the catalyst is made by reduction and in which the iron oxide is assumed to be all $Fe_3O_4$. The catalyst can be in the form of particles in the sieve range 18 to 4 ASTM (1–4.7 mm) especially 10 to 5(2–4), if it is desired to maximise their available contact surface or larger, for example up to 20 mm; the arrangement of the catalyst in the synthesis reactor preferably therefore may afford short gas flow paths, such as by radial or secantial flow in a cylindrical reactor. The catalyst volume is suitably in the range 100–200 m$^3$ per 1000 metric tons per day output. At the preferred synthesis pressures the attainable pass conversion over the synthesis catalyst is relatively low, giving an ammonia outlet concentration in the range 8 to 12% v/v. The ratio of recycled gas to fresh gas is suitable in the range 4 to 6.

In step (c) the ammonia is preferably absorbed in aqueous ammonia instead of or in addition to pure water, in order to provide as concentrated a solution of ammonia as possible. More than one absorbing stage can be used. The solution fed to the first absorbing stage contains preferably 15–30% w/w of ammonia and is discharged at a concentration typically in the range 20–50% w/w to users of aqueous ammonia or to a distillation system. Solutions fed in subsequent absorbing stages may typically contain up to 10% w/w of ammonia.

The aqueous ammonia with which the gas is contacted in step (d) in order to remove residual water has a temperature preferably below −10° C., for example in the range −25° to −33° C. Such solutions which contain respectively at least 8, at least 16 and at least 19% w/w of $NH_3$, decrease the ammonia content preferably to below 1% v/v as well as decreasing the water content to <500, eg 5–100 ppm v/v. Consequently it is possible to obtain a very favourable conversion of synthesis gas and yet substantially to avoid poisoning of the catalyst by water. The required low temperatures are provided by a refrigeration system which is of low energy consumption owing to the small quantities of water and ammonia that are absorbed. Very conveniently refrigeration is by evaporation of liquid aqueous or anhydrous product ammonia followed by recycle of the ammonia gas to the ammonia recovery system, so that no separate refrigeration machinery is needed.

The gas leaving the cold contacting stage can be passed over the solid absorbent such as a molecular sieve to remove water and/or ammonia more completely from it and thus to provide a margin of safety should the cold contacting stage become defective. By the use of both aspects of the invention an optimised process with limited refrigeration and limited solid absorbent volume can be designed.

The plant in which the process is carried out according to either aspect of the invention separately or in combination and, for the second aspect, the absorber having an ammonia absorption section and downstream thereof a contact region and means for circulating chilled aqueous ammonia through it are believed to be new and thus they constitute further features of the invention.

Figure 1:
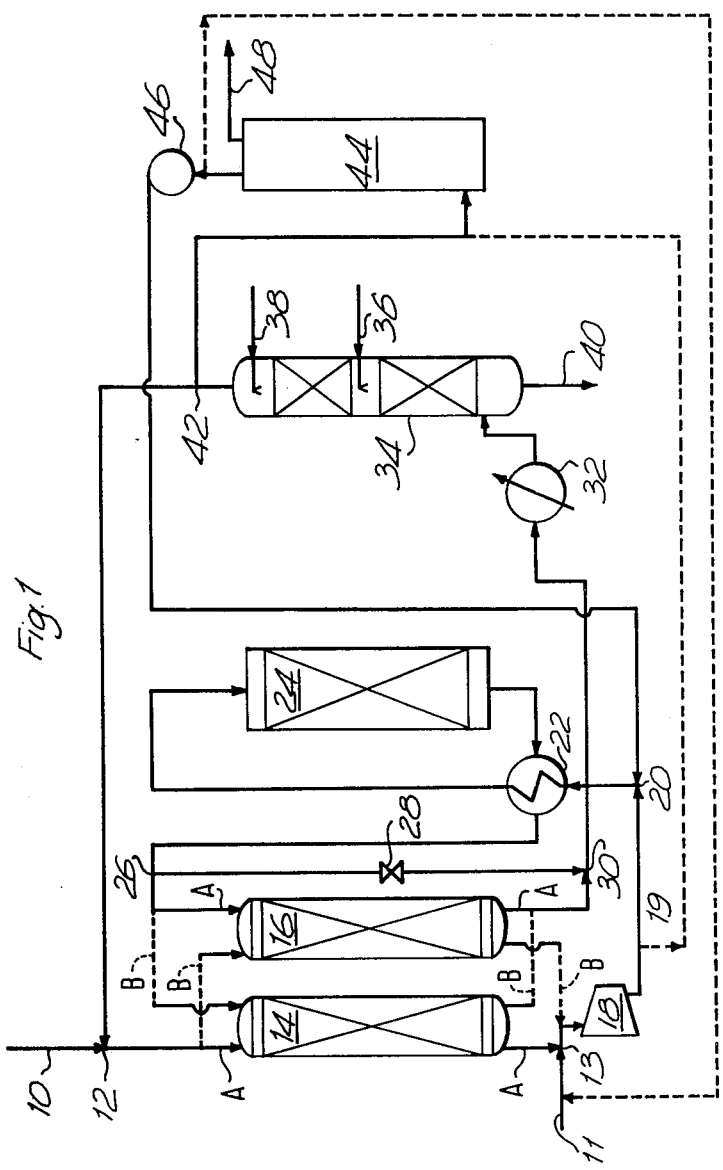
FIG. 1 is a flowsheet of an ammonia synthesis loop according to the invention in its first aspect and showing alternative gas flow paths A and B.

Referring to FIG. 1, and describing path A first, fresh synthesis gas enters at 10 from a synthesis gas generation section in which carbon oxides are removed by a process step, such as absorption in copper liquor or methanation, that leaves a residual content of water. Alternatively, if the fresh synthesis gas has been purified cryogenically or if it has been thoroughly dried, it enters at 11. The moist gas from 10 is united with recycled unreacted synthesis gas (to be described) at 12 and passes via path A into drier 14, which is charged with a solid water-absorbent such as a molecular sieve. Dried gas leaves drier 14, mixes with a return hydrogen stream at 13 (if present: dotted path described below) and enters circulator 18, where its pressure is increased sufficiently to maintain circulation. In the alternative process using dry fresh synthesis gas, only recycled gas passes through drier 14 and the dry fresh synthesis gas and a return hydrogen stream (if present:dotted path described below) entering at 11 are united with dry recycled gas at 13 and passed to circulator 18. Gas from circulator 18 is united at 20 with a return hydrogen stream (to be described) if one is present and heated in feed/effluent heat exchanger 22 to the inlet temperature of the ammonia synthesis catalyst in reactor 24. (The dotted path from point 19 is described below). Hot reacted gas leaving reactor 24 passes through the hot side of heat exchanger 22 and may be divided at point 26 into a by-pass stream flowing through control valve 28 to re-uniting point 30, and a regeneration stream flowing by path A into and out of drier 16 to re-uniting point 30. Gas from point 30 is cooled further at 32 and passed into absorber 34 in which it is scrubbed with water. Absorber 34 contains a lower section fed with lean aqueous ammonia solution 36, in which the bulk of the ammonia in the gas is dissolved, and upper section fed with cold water or very weak aqueous ammonia solution 38. By the use of these two sections the increase in vapour pressure of ammonia and water due to heat of solution is largely confined to the lower section, so that the gas leaving the absorber contains only a small concentration of ammonia and water. Aqueous concentrated ammonia product is taken off at 40 to a distillation system to produce anhydrous ammonia. Gas leaving the top of absorber 34 is all sent to point 12 for drying and recycling if it contains no non-reactive components. Otherwise (full lines) it is divided at 42 into a main recycle stream to be sent to point 12 and a purge stream which is passed to hydrogen recovery unit 44. Unit 44 typically includes a drier and a cryogenic fractionation plant in which the gas is cooled to about −188° C. to condense out methane and noble gases and any excess of nitrogen. The uncondensed fraction consisting of substantially pure hydrogen, along with sufficient nitrogen if it is not in excess in the main recycle stream, is fed via blower 46 to point 20 where it is united with synthesis gas about to be heated at 22 and fed to reactor 24. The uncondensed fraction is re-evaporated in order to cool purge gas entering unit 44 and is discharged at 48. If it contains sufficient methane it can be used as fuel in a furnace in the synthesis gas generation section. If the separation unit is suitably designed, the gas discharged at 48 can consist of a number of streams one of which is a methane-rich stream suitable as process feedstock in synthesis gas generation.

The dotted path from point 19 into unit 44 and then to point 11 is an alternative to the full-line path from point 42 into unit 44 and then to point 20. It has the advantage that gas is taken out just downstream of circulator 18 where its pressure is highest and returned just upstream of circulator 18 where its pressure is lowest and thus that no separate blower such as 46 is needed.

During operation of the process using gas flow paths A, drier 14 gradually becomes charged with water. When drier 14 has become charged to the design level, the gas flow is switched to paths B. Hot reacted synthesis gas then flows through drier 14 and moist recycle gas possibly containing moist fresh synthesis gas from the synthesis gas generation section through drier 16. When drier 16 has become water-charged to the design level the gas flow is switched back to paths A. Either of driers 14 and 16 can be duplicated to permit its temperature to be adjusted in advance of use by a side stream of the gas to which it is to be next subjected. Alternatively the return hydrogen stream from unit 44 is fed through the regenerated charge in order to cool it and then to the inlet of circulator 18.

In the flowsheet, reactor 24 is shown, for simplicity, with a single catalyst bed, single gas feed point and an external feed/effluent heat exchanger and without internal cooling or external heat recoveries. In practice a more complicated reactor would be used. Further the cooling of reacted synthesis gas has been represented in feed/effluent heat exchanger 22 and cooler 32: in practice heat is recovered by for example steam raising and/or boiler feed water heating by means of heat exchange upstream and/or downstream of 22 and only the lowest grade heat is discarded.

In a synthesis process at 51 bar pressure producing 1360 metric tons per day of ammonia three charges (20 metric tons each) of zeolite A are suitably used, two in parallel at position 14 drying recycled synthesis gas at 35° C. and one at position 16 undergoing regeneration by reacted synthesis gas at 300° C. followed by cooling by means of the hydrogen stream from unit 44. The two beds at position 14 are out of the step by half the time taken to load each of them with water and the total time for regeneration and cooling is arranged to be half the loading time. Typical gas compositions and flow rates are:

|  | % v/v | | | | | | kg mol h$^{-1}$ |
|---|---|---|---|---|---|---|---|
|  | $N_2$ | $H_2$ | Ar | $CH_4$ | $NH_3$ | $H_2O$ |  |
| Reacted synthesis gas entering 14 | 24.9 | 70.3 | 0.7 | 4.0 | 0.2 | 0.11 | 42000 |
| Reacted synthesis gas leaving 14 | 24.9 | 70.3 | 0.7 | 4.0 | 0.2 | * | 42000 |
| Reacted synthesis gas entering 16 | 21.2 | 63.6 | 0.7 | 4.0 | 10.4 | 0.0 | 2500 |
| Return hydrogen stream entering 16 | 13.5 | 85.8 | 0.6 | 0.1 | 0.0 | 0.0 | 2000 |

*under 1 ppm v/v

Figure 2:
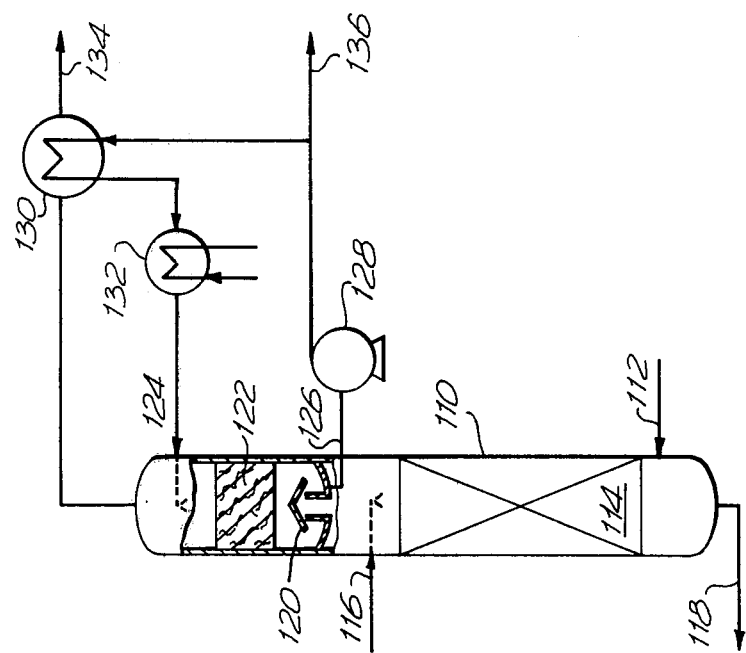
FIG. 2 represents an ammonia absorber according to the invention in its second aspect.

Referring to FIG. 2, absorber 110 is fed at 112 with cool reacted ammonia synthesis gas from a catalytic reactor and cooling system (not shown). The gas enters packing 114 down which is fed from 116 a stream of aqueous ammonia bottoms from a distillation system (not shown). Solution enriched in ammonia leaves the bottom of absorber 110 at 118 and is passed as feed to the distillation system. If desired, packing 114 could be subdivided into 2 or more sections each fed with aqueous ammonia of a different concentration, such as may be derived from different sections of a distillation system. Furthermore, in order to effect more rapid removal of the heat of solution of ammonia, solution leaving the the bottom of packing 114 or of one or more subdivisions of it could be withdrawn, cooled and pumped back to the top of the packing or of a subdivision of it. Gas depleted in ammonia from the top of packing 114 passes upward through chimney-plate 120 in which it contacts cold aqueous ammonia in packing 122. In cold aqueous ammonia absorbs water and ammonia from the gas, collects on chimney-plate 120 and passes out of absorber at 126. From thence it is delivered by pump 128 to heat exchanger 120 in which it is cooled and then to chiller 132 in which its temperature is decreased to the low level required at feed point 124 of absorber 110. Heat exchanger 130 effectively recovers cold from the gas leaving absorber 110. Chiller 132 can be cooled by a refrigeration system (using for example ammonia or FREON or ARCTON as its working fluid) independent of the ammonia recovery system; or alternatively liquid anhydrous product ammonia can be evaporated in chiller 132 and the vapour absorbed in water and fed back to the distillation section. Gas leaves exchanger 130 at 134 and is fed back via the usual heaters to the synthesis catalyst. Since liquid fed at 124 absorbs ammonia and water from the gas the volume of liquid in the system increases and accordingly a purge of aqueous ammonia is taken at 126 and fed to the distillation system.

In the process according to this flowsheet fresh synthesis gas can be added upstream of point 112 or between packed sections 114 and 122 in order to remove traces of water vapour from it.

In a typical process the stream compositions and temperatures are typically as in the Table.

TABLE

| Position | Temp °C. | Composition of liquid or gas | | |
|---|---|---|---|---|
| | | $NH_3$ % v/v in gas | $NH_3$ % Mole in liquid | Water % v/v in gas |
| 112 gas | 35 | 10.4 | — | 0.0 |
| 116 liquid | 35 | — | 20 | — |
| 118 liquid | 45 | — | 35 | — |
| 120 gas | 35 | 1.5 | — | 0.11 |
| 124 liquid | −33 | — | 35 | — |
| 126 liquid | 0 | — | 36 | — |
| 134 gas | −10 | 0.3 | — | 130 ppm |

I claim:

1. An ammonia synthesis process which comprises the steps
   (a) passing a mixture of nitrogen and hydrogen over an ammonia synthesis catalyst whereby to effect incomplete reaction to ammonia;
   (b) cooling the reacted gas mixture;
   (c) contacting the cooled gas mixture with water whereby to produce an aqueous solution of ammonia and a stream of unreacted gas containing water vapour;
   (d) drying said unreacted gas by passing it through a charge of regenerable solid absorbent until said charge is loaded with water and switching the unreacted gas flow to a fresh or regenerated charge;
   (e) recycling dried unreacted gas to the synthesis catalyst;
   (f) maintaining circulation of gas through preceding steps (a) to (e) by means of a compressor;
   (g) adding fresh synthesis gas to the circulating gas; the process being further characterized by
     (i) adding said fresh synthesis gas between step (b) and step (d), whereby to remove any water vapour from it;
     (ii) operating said compressor in step (f) downstream of said drying step (d) and upstream of said synthesis catalyst;
     (iii) regenerating said water-loaded charge with hot ammonia-containing synthesis gas after step (a) but before step (c) whereby to displace water from it and provide the regenerated charge required in step (d); and
     (iv) separating the displaced water from the gas, along with the ammonia contained therein, by cooling the gas in said step (b) and contacting the cooled gas with water in step (c).

2. A process according to claim 1 in which in step (iii) the synthesis gas contacted with the water-loaded absorbent is at a temperature in the range 60°–350° C.

3. A process according to claim 2 which in step (iii) includes cooling the regenerated charge by passing dry gas through it, before bring that charge into use in step (d).

4. A process according to claim 3 in which said fresh synthesis gas added in step (g) contains non-reacting gases, which process includes the steps of purging off a stream containing recycled synthesis gas, treating it to separate a hydrogen-enriched stream, passing that hydrogen-rich stream through said regenerated charge whereby to cool it and returning said hydrogen-enriched stream to the circulating synthesis gas.

5. A process according to claim 1 in which the absorbent is a zeolite, and wherein fresh synthesis gas is added between step (c) and step (d) in step (i), whereby any water vapour in it is removed by the solid absorbent.

6. An ammonia production process including an ammonia synthesis process according to claim 1 in combination with fresh synthesis gas generation at such a pressure that the fresh synthesis gas is compressed by not more than 50% before being fed to the synthesis.

7. An ammonia synthesis process according to claim 1 in which step (d) comprises contacting the gas with liquid aqueous ammonia at a temperature below 0° C. to decrease its water content and then passing said gas through the solid absorbent.

* * * * *